G. H. CURTISS.
LANDING GEAR FOR AIRCRAFT.
APPLICATION FILED NOV. 22, 1913.
1,223,315.
Patented Apr. 17, 1917.
2 SHEETS—SHEET 1.
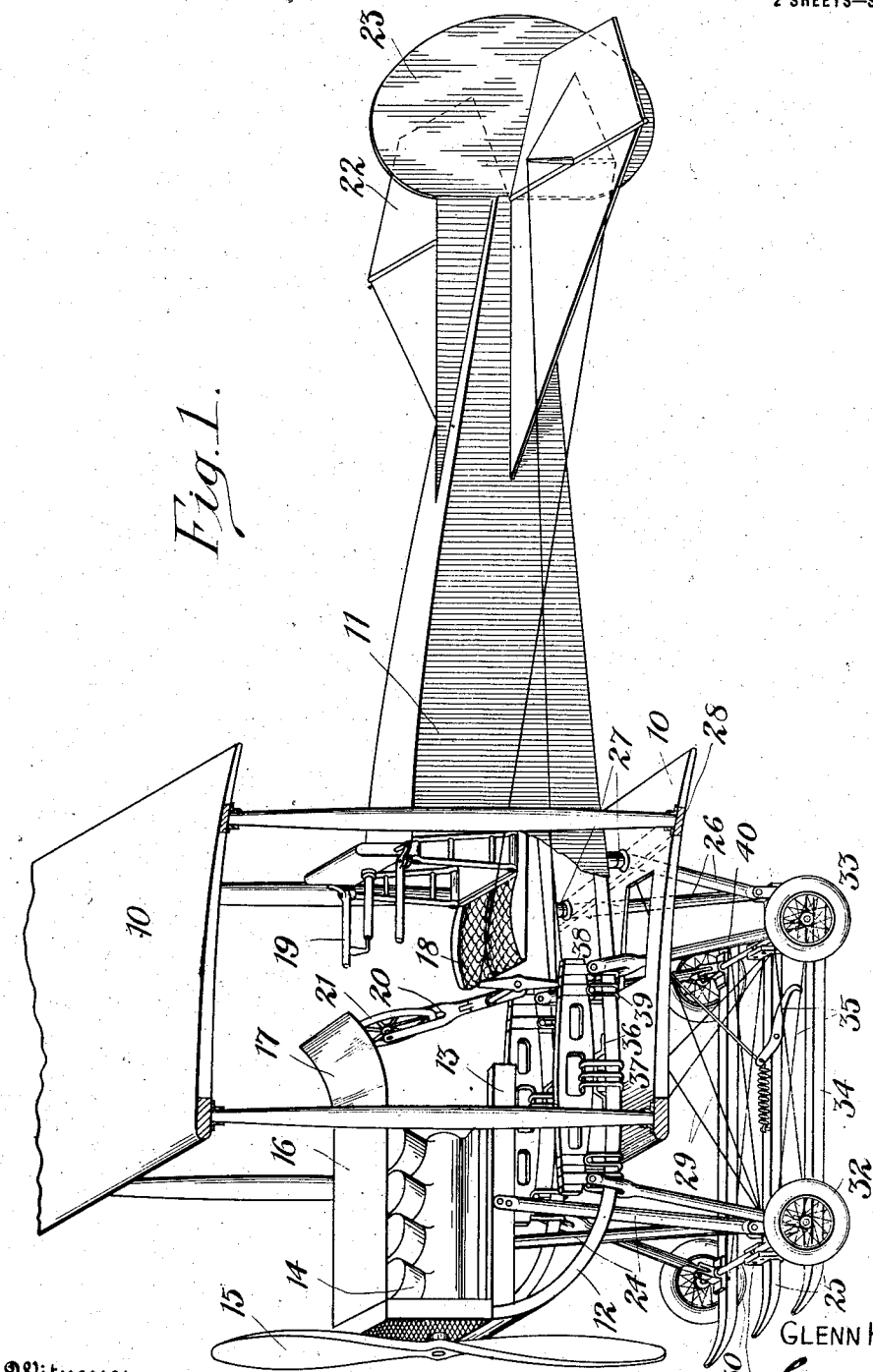
Inventor
GLENN H. CURTISS.

G. H. CURTISS.
LANDING GEAR FOR AIRCRAFT.
APPLICATION FILED NOV. 22, 1913.

1,223,315.

Patented Apr. 17, 1917.
2 SHEETS—SHEET 2.

Inventor
GLENN H. CURTISS.

UNITED STATES PATENT OFFICE.

GLENN HAMMOND CURTISS, OF HAMMONDSPORT, NEW YORK, ASSIGNOR TO THE CURTISS MOTOR COMPANY, OF HAMMONDSPORT, NEW YORK, A CORPORATION OF NEW YORK.

LANDING-GEAR FOR AIRCRAFT.

1,223,315.	Specification of Letters Patent.	Patented Apr. 17, 1917.

Application filed November 22, 1913. Serial No. 802,428.

*To all whom it may concern:*

Be it known that I, GLENN H. CURTISS, a citizen of the United States, residing at Hammondsport, in the county of Steuben and State of New York, have invented certain new and useful Improvements in Landing-Gear for Aircraft, of which the following is a specification, reference being had therein to the accompanying drawing.

My invention relates to landing gear more particularly adapted for use in connection with that type of air craft commonly known as the heavier than air type. As will be seen however upon an understanding of my invention, this landing gear may also be adapted for use in connection with air craft of the lighter than air type. The principal object of the invention is the production of a landing gear through the use of which landing may be made upon plowed or other extremely rough ground without damage to the machine or the occupant, and even without discomfort to the latter.

A landing gear in order to attain this object must necessarily be of very sturdy and strong construction, and this very fact has heretofore been a drawback, paradoxical as it may seem, for the reason that when the structure is made of sufficient strength and sturdiness to stand the severe strains imposed upon it, the proper articulation and yielding connection of the various parts for the introduction of equalizing connections between the various wheels becomes more difficult. By my invention I attain this latter end without any sacrifice whatsoever to the strength and sturdiness of the structure.

According to my invention I make use of three or more heavy pneumatic tired wheels or the equivalent, whereby a broad landing base is formed so to speak, and without the use of trailing skids such as are common in the ordinary two-wheeled landing gear. The greater the area covered by this base, the more stable is the machine upon its wheels and the less liability there is of a sudden lurch to one side and a disastrous digging in of one wing tip. In the preferred form of my invention illustrated herein, I make use of four wheels, divided into two groups of two each, one group being disposed on each side of the central longitudinal plane of the craft. The wheels of each group follow each other in the same track whereby the hindermost wheels travel in the rut created by the foremost wheels. These wheels are spaced apart from and have articulated connection with a centrally located dependent frame work rigidly connected with the main body of the craft, the articulated connection permitting the individual movement of each wheel in a vertical plane. Braces connect the wheels of each group and positively define their longitudinal positions as respects the main body of the craft and insure the continuance of their following relation. On each side of the central longitudinal vertical plane of the craft is an equalizing member connected with the main body of the craft on the one hand and by an articulated connection with the wheels of the corresponding group on the other, whereby the craft is normally supported from the wheels through the equalizing members and the articulated connection aforesaid, and movements of the wheels of each group are correlated and equalized. Shock absorbing means are provided at advantageous points in the articulated connections and between the equalizing members and the frame, whereby in addition to equalization of the movement between the several wheels, there is an absorption of shock which would otherwise be transferred directly through the equalizing members to the main body of the craft.

Referring to the drawings,

Figure 1 is a perspective view of a craft equipped with the landing gear of my invention, the craft being of the heavier than air type and the main supporting surfaces being broken away in sections to permit unobstructed view of the elements of the landing gear.

Figure 4:
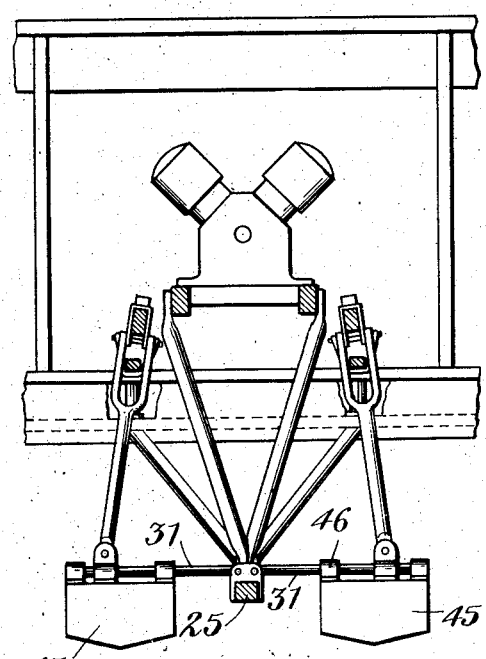
Fig. 4 is a view similar to Fig. 2, showing the attachment of a multiple number of hydroplane floats after the fashion of the catamaran type of hydroplanes now in use.

The aeroplane shown is of the tractor type comprising upper and lower main supporting surfaces 10, and the fuselage 11 located between the upper and lower planes 10. The fuselage 11 is of stream-line form and of rectangular cross section, and its frame work is formed of longitudinally extending main beams 12 bent upwardly at the front of the machine and projecting some distance in front of the main supporting surfaces 10. Connected with the front ends of the main beams 12 are the beams 13 of the engine base which may be suitably supported in any desired manner from the beams 12 at their rear ends, preferably by steel tubing as is common. Driving motor 14 and screw 15 are suitably mounted upon the base 13 and provided with a sheet metal hood 16 the rear end of which 17 is bent upwardly to form an air deflecting shield. The nacelle of the craft is located just back of the engine 14 behind the shield 17 and between the main supporting surfaces 10, whereby the operators are in a measure protected from the weather and whereby they may be readily protected from projectiles by simply armoring the lower supporting surface 10 and the sides of the fuselage 11. There are provided in the nacelle two seats 18 for the operators. The usual Curtiss double shoulder fork control 19 is associated with the seats 18 while in front of the seats 18 is provided the shiftable Curtiss steering post 20 and wheel 21, all of which operate in a manner well understood. Suitable ailerons (or if desired wing surfaces) are operated from the shoulder forks 18, and the horizontal rudder 22 and the vertical rudder 23 (which are mounted directly upon the tail end of the fuselage 11) are respectively operated from the post 20 and the steering wheel 21.

Depending from the main body of the craft constituted by the beams 12 and 13 of the fuselage 11, is a rigidly connected frame work composed of converging struts 24 connected at their upper ends each to a beam 13 of the motor base and at their lower ends connected jointly to a longitudinally extending skid beam 25, and a pair of rearwardly placed diverging struts 26 connecting at their upper ends each with an upright 27 connected with a beam 12 of the fuselage 11, and at their lower ends connecting jointly with the rear end of the skid beam 25. The hinder struts 26 connect with the uprights 27 through the trailing beam 28 of the main supporting surfaces, the upper ends of the struts 26 and the lower ends of the uprights 27 being respectively mounted in suitably disposed sockets or otherwise connected with the beam 28. The structure so formed is braced to form a rigid frame work by diagonally run steel cables 29.

On each side of this frame work and laterally spaced therefrom but having articulated connection therewith by means of axles 30 hinged to the central skid beam 25 at 31, is a pair of following wheels 32—33. By reason of the articulated connection 30—31, each wheel has free movement in a vertical plane, but between each pair of wheels 32—33 are provided longitudinally extending skid beams 34 connected with the axles 30 near the outer ends thereof and in fixed position substantially parallel to the central skid beam 25, whereby the longitudinal positions of the wheels 32—33 as respects each other and as respects the body of the craft are fixed, although, articulated connections of any usual and desirable character must obviously be provided to mount the wheels of each pair upon their respective skid beams, in order to provide the play necessary to prevent transverse twisting of the beams 34 when wheels of the same pair are given different vertical movements. Additional bracing means having the same function as the skid beams 34 are provided in the form of diagonally extending cables 35 which make of the structure 30—34 a frame which is substantially rigid in the horizontal plane. The free and individual vertical movement of the wheels 32—33 is however not impaired. Mounted above each main beam 12 and pivotally and yieldingly connected therewith by means of leather buffers 36 and flexible binding bands 37 is an equalizing bar 38. The opposite ends of each bar, which it will be observed are normally spaced apart from the main beams 12, are connected to the main beams 12 by means of flexible bands 39. Each wheel of each pair 32—33 is connected to an adjacent end of the corresponding equalizing bar by an upright 40 having articulated connection with the wheel axle, (and through the axle with the wheel) at its lower end and with the equalizing bar 38 at its upper end. As shown the upper end of each upright 40 is forked around beam 12, and the branches of the fork pivotally connected with the bar 38 by means of transversely extending bolt 41 (see Figs. 2 and 4) which bolt in addition to connecting the upright to the bar serves as means to connect a flexible band 39.

The operation of my invention is as follows: Assuming the machine to have been in flight and landing to be attempted upon plowed or other rough ground, the front wheels 32 of the pairs 32—33 strike the ground first. Vertical movement of these wheels follows the impact and each wheel moves independently of the other, producing a correlated downward movement of the hindmost wheels 33 by reason of the rocking of the bars 38 over the buffers 36. The hindmost wheels therefore touch the earth a moment or two earlier than would be the case if they were connected immovably with the craft, and instead of there being a rebound as in case of rigid connection, the inertia of the descending tail of the craft is progressively absorbed by the hindmost flexible bands 39, and the machine continues over the extremely rough ground with all four wheels in action until it comes to a standstill, the impact and shock due to heavy irregularities being the while wholly equalized and absorbed by the mechanism, each individual wheel moving independently of the others. This individual movement however does not in any wise interfere with movement in unison when such movement is enforced through the encountering of symmetrically disposed land formation. Obviously under such conditions either pair of wheels 32—33 may move in unison, while the other pair does not, and so also the front wheels 32 may move in unison while the hindmost wheels 33 do not and vice versa. In fine, there is no formation whatsoever of the kind ordinarily met with, to which this landing gear will not accommodate itself.

In starting, the operation is entirely similar to that in landing, and in fact it has been found that the machine of my invention may be run for long periods of time upon the ground without damage to the machine or discomfort to the operator. By virtue of the employment of the articulated construction set forth, it has been possible to construct all parts of more than ample strength and sturdiness.

Figure 2:
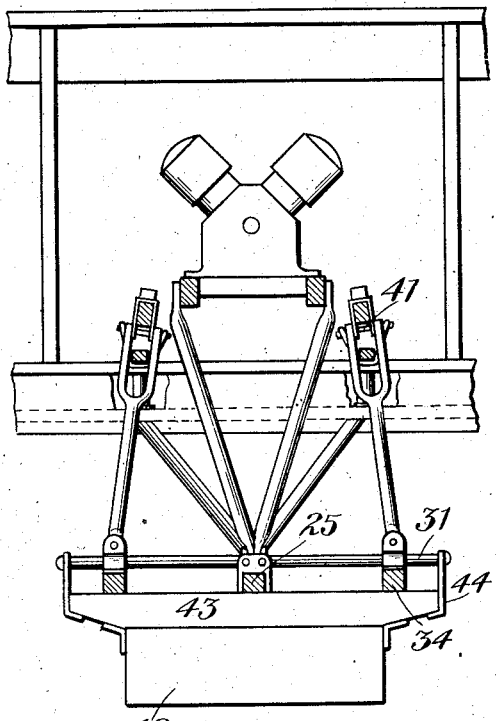
Fig. 2 is a transverse section of the front portion of the same showing a hydroplane float attached to the wheels.
Figure 3:
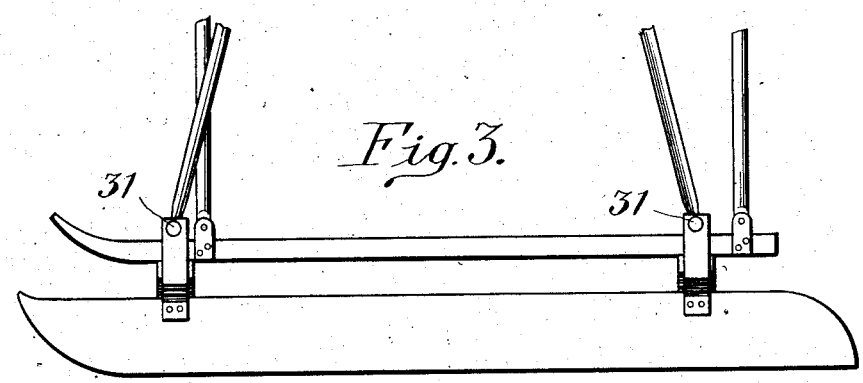
Fig. 3 is a side view of the hydroplane float and the lower ends of the parts to which it is attached.

In Fig. 2 I have shown the wheels 32—33 detached, and a centrally disposed hydroplane float 42 attached. This attachment is made by simply attaching transverse beams 43 of the requisite length to the body of the float 42 at points spaced apart a distance equal to the distance between the axles 31, and connecting the outer ends of these beams 43 with the outer ends of the axles 31 by means of metallic brackets 44. The skid beams 25 and 34 then rest commonly upon the tops of the beams 43. When so attached, the float 42 may oscillate about the beam 25 as an axis, the connections 44 having sufficient lost motion to permit any desired degree of this regulating movement. There is obviously not the same necessity for equalizing the impacts of landing with the hydroplane float.

In Fig. 4 however I have shown an arrangement in which there is longitudinal as well as lateral equalization of the impacts of landing. In this construction I employ two hydroplane floats 45, one connected to the axles 31 on one side of the central skid 25 and the other connected to the axles 31 on the opposite side, the connection being made by means of strips 46 which pivotally connect the floats 45 with the axles 41. The outboard skid members 34 are shown as removed, the floats 45 taking the place of the same, but they may be included if desired.

In this arrangement it is obvious that each end of each float 45 may move vertically independently of other portions, and the same advantages are attained as are found in connection with the wheeled chassis of Fig. 1.

I have shown and described the best embodiments of my invention at present known to me but it is obvious that the invention may be given other embodiments by those skilled in the art without departing in any wise from its elemental and generic spirit. I desire to cover in the annexed claims all such embodiments.

I desire here to mention the fact that the wheels may be removed if desired in case of any emergency, and landing made upon the skid beams 25—34, the front ends of said beams being upturned to admit of this. In actual practice in case of extremely severe jolting the machine may ride upon the beams as well as upon the wheels.

What I claim is:

1. In combination an air craft, a landing chassis therefor comprising two laterally disposed pairs of wheels, and articulated longitudinal connections between the wheels of each pair, and further articulated connections extending transversely between the corresponding wheels of the pairs.

2. In combination, an aircraft including a framework and a landing chassis, wheels for the chassis in laterally disposed pairs, articulated axles connecting corresponding wheels of opposite pairs, a single member depending from said framework for the support of each wheel and articulated at its extremities to connect the framework with the appropriate axle in the plane of the articulations of the latter.

3. A landing chassis for aerial vehicles comprising a framework rigidly connected with the main body of the craft, a plurality of following wheels in fixed longitudinal and transverse relation having articulated connection with said framework, and an equalizing connection between said following wheels on the one hand and the main body of said craft on the other, whereby the rise and fall of said wheels in the vertical plane is correlated and the effect of such rise and fall on the main body of the craft minimized.

4. In combination an air craft, a rigidly connected frame work depending therefrom, a plurality of following wheels having articulated connection with said frame work for movement in the vertical plane with respect to the main body of said craft, but having interconnecting braces fixing their transverse and longitudinal positions, an equalizing member having a rocking connection with the main body of said craft, and a connecting member between each wheel and said equalizing member, said connecting member being pivotally joined both to the wheel and to the equalizing member.

5. In combination an air craft, a depending frame work fixedly connected therewith, a plurality of following wheels having articulated connection with said frame work and laterally removed therefrom, braces spacing said wheels longitudinally apart, an equalizing member having a yielding connection with the main body of said craft, and yielding connection between each of said wheels and said equalizing member connecting with the wheel in each case at a point removed from the point of its articulated connection aforesaid.

6. In combination an air craft, a rigidly connected framework depending therefrom, a pair of following wheels having articulated connection with said frame work permitting movement in the vertical plane, braces between said wheels positively defining their transverse and longitudinal position, said wheels being laterally spaced apart from their points of articulation with said frame, an equalizing bar above said wheels and having a pivoted central connection with the main body of said craft, and an upright member between each wheel and an end of said equalizing bar, said member having pivotal connection with the wheel at a point removed from said depending frame work on the one hand, and pivotal connection with the end of said equalizing bar on the other.

7. In combination an air craft, and a landing chassis therefor comprising a depending frame work rigidly connected with the main body of the craft, a pair of following wheels removed laterally from said frame work but having articulated connection therewith permitting free movement in the vertical plane, braces between said wheels positively defining their transverse and longitudinal positions, an equalizing bar having a yielding connection with the main body of said air craft on the one hand and a pivotal connection with said wheels on the other.

8. In combination an air craft and a landing chassis therefor comprising a centrally disposed depending frame work rigidly connected with the main body of the craft, laterally disposed pairs of following wheels one on each side of said frame work, and having articulated connection therewith, braces between the wheels of each pair positively defining their transverse and longitudinal positions, longitudinally extending equalizing bars connected with said main body by a central pivotal connection and lying one on each side of the longitudinal axis thereof, and an upright connection between each wheel and the adjacent end of that equalizing bar on the same side of the axis as the wheel.

9. In combination an air craft, and a landing chassis therefor comprising a centrally located depending frame work rigidly connected to the main body of the craft, oppositely disposed pairs of following wheels laterally removed from said frame work but having articulated connection therewith, braces between the wheels of each pair positively defining their longitudinal positions with respect to the main body of the craft without limiting movement permitted by the articulated connection, a pair of longitudinally disposed equalizing bars centrally connected yieldingly with said main body one on each side of the longitudinal axis thereof, and uprights between said wheels and the ends of said equalizing bars, each upright having pivotal connection with one of the connected elements at one end and yielding connection with the other of said elements at the other end.

10. In combination an air craft having a main body comprising a fuselage the frame of which is composed of longitudinally extending main beams, a longitudinally extending engine base substantially parallel with said main beams but spaced apart therefrom and connected thereto, a depending frame work rigidly connected at one end to said engine base and at the other end to said main beams, laterally disposed groups of following wheels one group on each side of said centrally disposed frame work and having articulated connection therewith, permitting individual vertical movement, braces between the wheels of each group defining their relative longitudinal positions with respect to the main body of the craft, equalizing members connected with the aforesaid main beams of the fuselage, and an upright establishing articulated connection between each wheel and the equalizing member on the corresponding side of the craft.

11. A landing chassis for air craft comprising a frame work rigidly connected with the main body of the craft, a plurality of longitudinally spaced laterally projecting axle members each having articulated connection with said central depending frame work permitting free vertical movement of the outer end thereof, means extending longitudinally between said axle members on the under side thereof adjacent their lateral extremities and adapted to support the same in the absence of wheels, and a vertically yielding connection between each end of said longitudinally extending means and the main body of the craft whereby each end of the same may move independently of the other end and oscillation may take place with respect to the said depending frame work.

12. In an aircraft, a landing chassis comprising a longitudinally extending member adapted to support the craft in the absence of wheels, said member being in position beneath the main body of the craft, means provided with a plurality of separate yieldable connections to the body of the craft and means connecting said chassis member pivotally to the first said means at a plurality of points whereby said chassis member may be moved freely at either end with respect to the longitudinal axis of the craft.

13. A landing chassis for aerial vehicles comprising a pair of longitudinally extending, laterally disposed supporting members, yieldable connections between the opposite ends of each of said members and the main body of the craft whereby each end of each member may move independently of the other end with respect to said aircraft body, and yieldable connections extending directly between the said supporting members whereby the latter may move independently of each other with respect to the craft, together with means positively defining the longitudinal positions of said members with respect to the longitudinal axis of the craft.

14. In an aircraft, main supporting surfaces, flight control means, a landing chassis arranged beneath the body of said aircraft, shock absorbing members extending from said chassis to a yieldable connection with the aircraft body, and arranged to project through openings in opposite supporting surfaces, and operators' seats arranged adjacent to said control means and to the openings in said surfaces, whereby the latter may be utilized to enlarge the outlook of the occupants of said seats.

15. In combination an air craft, and a landing chassis for the same, comprising a pair of following wheels, an equalizing member between said wheels and a yielding connection between said equalizing member and the main body of the craft.

16. In combination an air craft, and a chassis therefor comprising a pair of following wheels, and an equalizing member between said wheels and having a pivotal connection with each, and a pivotal connection with the main body of the craft.

17. In combination an air craft, and a landing chassis therefor comprising a pair of following wheels, together with an equalizing member between said wheels and having a pivotal connection with the wheels on the one hand and a yielding connection with the main body of the craft on the other.

18. In combination an air craft, and a landing chassis comprising a ground running member and a longitudinally elongated shock absorbing member intermediate the ground running member and the main body of said craft, having multiple yielding connections with said main body and balanced for oscillation about a central connection.

19. In combination, an aircraft, a landing chassis therefor comprising two laterally disposed pairs of wheels and articulated longitudinal connections between the wheels of each pair by way of intermediate attachment to the aircraft, and additional articulated connections extending transversely between the corresponding wheels of the pairs.

20. In combination, an aircraft and a landing chassis comprising a pair of ground running members mounted for independent vertical movement with respect to each other and means separately connecting to each member but commonly suspended by the aircraft to yieldably resist the said independent, vertical movement of the members.

21. In combination, an aircraft and a landing chassis comprising pairs of ground running members, articulated means between the pairs of ground running members to afford independently variable movement therebetween and means having a common yieldable and pivotal suspension from the aircraft to afford variably independent movement between the members of each pair.

22. In a landing gear for aircraft, wheels projected from the body of the craft by struts, articulated connections between the respective wheels, and shock absorbing devices common to the wheels at opposite sides of the fore and aft axis of the craft.

In testimony whereof I affix my signature in presence of two witnesses.

GLENN HAMMOND CURTISS.

Witnesses:
H. C. GENUNG,
J. A. D. McCURDY.